US009342939B1

(12) United States Patent
Boyle

(10) Patent No.: US 9,342,939 B1
(45) Date of Patent: *May 17, 2016

(54) METHOD AND SYSTEM UTILIZING MAGNETIC CARD KEY WITH A QRC

(71) Applicant: Joingo, LLC, San Jose, CA (US)

(72) Inventor: Stephen S. Boyle, Lincoln, CA (US)

(73) Assignee: Joingo, LLC, San Jose, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/664,084

(22) Filed: Mar. 20, 2015

Related U.S. Application Data

(63) Continuation of application No. 13/787,777, filed on Mar. 6, 2013, now Pat. No. 8,985,443.

(60) Provisional application No. 61/625,684, filed on Apr. 18, 2012.

(51) Int. Cl.
*G06K 7/01* (2006.01)
*G07C 9/00* (2006.01)
*G06Q 50/12* (2012.01)

(52) U.S. Cl.
CPC ............ *G07C 9/00722* (2013.01); *G06Q 50/12* (2013.01); *G07C 9/00103* (2013.01); *G07C 9/00571* (2013.01); *G07C 9/00857* (2013.01); *G07C 9/00904* (2013.01)

(58) Field of Classification Search
CPC ........... G07C 9/00103; G07C 9/00904; G07C 9/00571; G07C 9/00722; G07C 9/00857; G06Q 50/12
USPC ............................................... 235/382, 382.5
See application file for complete search history.

(56) References Cited

U.S. PATENT DOCUMENTS

| | | | | | |
|---|---|---|---|---|---|
| 5,614,703 | A * | 3/1997 | Martin | G07C 9/00103 | 235/375 |
| 2006/0087410 | A1 * | 4/2006 | Garcia | G07C 9/00103 | 340/309.16 |
| 2009/0066476 | A1 * | 3/2009 | Raheman | G07C 9/00103 | 340/5.64 |
| 2013/0059603 | A1 * | 3/2013 | Guenec | G06Q 10/02 | 455/456.2 |
| 2013/0127593 | A1 * | 5/2013 | Kuenzi | G07C 9/00103 | 340/5.61 |
| 2013/0166441 | A1 * | 6/2013 | Kobylkin | G06Q 20/354 | 705/39 |

* cited by examiner

*Primary Examiner* — Thien M Le
*Assistant Examiner* — Claude J Brown
(74) *Attorney, Agent, or Firm* — Clause Eight IPS; Michael Catania

(57) ABSTRACT

A method and system for self-service access to a card key locked room of a facility is disclosed herein. A magnetic card key with a QRC is utilized with a mobile application resident on a mobile communication device to activate the card and allow for self-service access to check into a hotel.

18 Claims, 6 Drawing Sheets

METHOD AND SYSTEM UTILIZING MAGNETIC CARD KEY WITH A QRC

CROSS REFERENCES TO RELATED APPLICATIONS

The present application is a continuation application of U.S. patent application Ser. No. 13/787,777, filed on Mar. 6, 2013, now U.S. Pat. No. 8,985,443, which claims priority to U.S. Provisional Patent Application No. 61/625,684, filed on Apr. 18, 2012, both of which are hereby incorporated by reference in their entireties.

STATEMENT REGARDING FEDERALLY SPONSORED RESEARCH OR DEVELOPMENT

Not Applicable

BACKGROUND OF THE INVENTION

1. Field of the Invention

The present invention generally relates to key card reservation technology. More specifically, the present invention relates to a magnetic card key with a QRC utilized for self-service checking-in to a hotel using a mobile communication device.

2. Description of the Related Art

Checking-in to a hotel can be time consuming if done at busy times. Waiting for a clerk to confirm a reservation and provide a room key can add unwanted waiting time to a business trip. Some hotels have self check-in/check-out kiosks that provide a guest with a self-check-in option. However, these kiosks can also be time consuming.

Quick reader codes ("QRC") are two dimensional codes comprising data. The actual code comprises a square with black modules arranged in various patterns. Hara et al., U.S. Pat. No. 5,726,435 for an Optically Readable Two-Dimensional Code And Method And Apparatus Using The Same has been credited with being one of the first, if not the first patent for QRC. Hara et al., discloses the basic mechanism for retrieving data from the QRC.

Yach, U.S. Patent Publication Number 2011/0101086 for a Device And Method For Contact Information Exchange discloses using a QRC on a business card to transfer information to a mobile telephone.

General definitions for terms utilized in the pertinent art are set forth below.

APP is a software application for a mobile phone such as a smart phone.

Application Programming Interface (API) is a collection of computer software code, usually a set of class definitions, that can perform a set of related complex tasks, but has a limited set of controls that may be manipulated by other software-code entities. The set of controls is deliberately limited for the sake of clarity and ease of use, so that programmers do not have to work with the detail contained within the given API itself.

BLUETOOTH technology is a standard short range radio link that operates in the unlicensed 2.4 gigaHertz band.

Code Division Multiple Access ("CDMA") is a spread spectrum communication system used in second generation and third generation cellular networks, and is described in U.S. Pat. No. 4,901,307.

CRM (Customer Relationship Management) is a widely-implemented strategy for managing a company's interactions with customers, clients and sales prospects. CRM involves using technology to organize, automate, and synchronize business processes and the like—principally sales activities, but also business processes and the like for marketing, customer service and technical support.

Direct Inward Dialing ("DID") involves a carrier providing one or more trunk lines to a customer for connection to the customer's private branch exchange ("PBX") and a range of telephone lines are allocated to this line.

FTP or File Transfer Protocol is a protocol for moving files over the Internet from one computer to another.

GSM, Global System for Mobile Communications is a second generation digital cellular network.

Hypertext Transfer Protocol ("HTTP") is a set of conventions for controlling the transfer of information via the Internet from a web server computer to a client computer, and also from a client computer to a web server, and Hypertext Transfer Protocol Secure ("HTTPS") is a communications protocol for secure communication via a network from a web server computer to a client computer, and also from a client computer to a web server by at a minimum verifying the authenticity of a web site.

Internet is the worldwide, decentralized totality of server computers and data-transmission paths which can supply information to a connected and browser-equipped client computer, and can receive and forward information entered from the client computer.

Interactive voice response ("IVR") is a telephone technology in which a user uses a phone to interact with a database to acquire information.

Long Term Evolution ("LTE") is a next generation communication network.

Multimedia messaging service ("MMS") communication is a communication transmitted to and from a mobile phone that includes a multimedia content such as a digital photograph (JPEG), videos, and the like.

Mobile Originated ("MO") is a text message that is sent from a mobile phone.

Mobile Terminated ("MT") is a text message that is sent to a mobile phone.

Public Switch Telephone Network ("PSTN") is a telecommunication system in which networks are inter-connected to allow telephones to communicate with each other throughout the world.

Short Message Service ("SMS") is text messaging communication using a mobile phone or other device to send messages up to 160 characters in length.

Short message peer-to-peer ("SMPP") is a telecommunications protocol for exchanging SMS messages between SMS peer entities.

Simple object access protocol ("SOAP") is a computer network protocol for exchanging information.

Simple mail transfer protocol ("SMTP") is a delivery protocol for email.

A SMS aggregator is an entity that provides connectivity with a mobile phone carrier by offering a SMS gateway to send and receive messages and other digital content.

A SMS Gateway is used to send text messages with or without a mobile phone, and is used by aggregators to forward text messages to mobile phones.

Telephone Consumer Protection Act ("TCPA") of 1991 restricts the use of SMS text messages received by mobile phones, and SMS messages sent without a consumer's consent can violate the TCPA.

Transfer Control Protocol/Internet Protocol ("TCP/IP") is a protocol for moving files over the Internet.

Voice over Internet Protocol ("VoIP") relates to communications transmitted over the Internet such as SKYPE.

URL or Uniform Resource Locator is an address on the World Wide Web.

User Interface or UI is the junction between a user and a computer program. An interface is a set of commands or menus through which a user communicates with a program. A command driven interface is one in which the user enter commands. A menu-driven interface is one in which the user selects command choices from various menus displayed on the screen.

Web-Browser is a complex software program, resident in a client computer, that is capable of loading and displaying text and images and exhibiting behaviors as encoded in HTML (HyperText Markup Language) from the Internet, and also from the client computer's memory. Major browsers include MICROSOFT INTERNET EXPLORER, NETSCAPE, APPLE SAFARI, MOZILLA FIREFOX, and OPERA.

Web-Server is a computer able to simultaneously manage many Internet information-exchange processes at the same time. Normally, server computers are more powerful than client computers, and are administratively and/or geographically centralized. An interactive-form information-collection process generally is controlled from a server computer, to which the sponsor of the process has access.

Wireless Application Protocol ("WAP") is an open, global specification that empowers users with mobile wireless communication devices (such as mobile phones) to easily access data and to interact with Websites over the Internet through such mobile wireless communication device. WAP works with most wireless communication networks such as CDPD, CDMA, GSM, PDC, PHS, TDMA, FLEX, reflex, iDEN, TETRA, DECT, DataTAC, Mobitex and GRPS. WAP can be built on most operating systems including PalmOS, WINDOWS, CE, FLEXOS, OS/9, JavaOS and others.

WAP Push is defined as an encoded WAP content message delivered (pushed) to a mobile communication device which includes a link to a WAP address.

The prior art fails to provide a solution to the current problems of self-service access to a room of a facility.

BRIEF SUMMARY OF THE INVENTION

The present invention is a key card with a QRC that works in conjunction with a mobile application on an end-user's mobile communication device to associate an identifier for the key card with an identifier for the end-user to allow access to a room of a facility reserved by the end-user.

One aspect of the present is a method for self-service access to a card key locked room of a facility. The method includes retrieving a magnetic card key. The magnetic card key has a unique card identifier on a magnetic strip and a QRC printed on a surface of the magnetic card key. The method also includes activating a mobile application resident on a mobile communication device of a guest. The mobile application is authenticated to the guest to produce a unique guest identity for the guest. The method also includes scanning the QRC with mobile communication device using the mobile application to decode and produce the unique card identifier for the magnetic card. The method also includes transmitting the guest identity and the unique card identifier over a network to an interaction server. The interaction server is in communication with a card key management system. The method also includes receiving the guest identity and the unique card identifier at the server, interfacing with the card key management system and registering the card identifier with a room selected for the guest associated with the guest identity. The method also includes accessing the room using the magnetic card.

Another aspect of the present invention is a system for self-service access to a card key locked room of a facility. The system includes a facility having a plurality of rooms, magnetic card keys, mobile communication devices, an interaction server and a card key management server. The magnetic card keys are located at the facility. Each of the magnetic card keys has a unique card identifier on a magnetic strip and a QRC printed on a surface of the magnetic card key. Each of the mobile communication devices has a mobile application resident on the mobile communication device. Each of the mobile applications is authenticated to a particular guest to produce a unique guest identity for each guest. Each of the mobile applications is configured to scan the QRC of a magnetic card key with the mobile communication device to decode and produce the unique card identifier for the magnetic card key and transmit the guest identity and the unique card identifier over a network. The interaction server is in communication with each of the mobile communication devices over the network. The interaction sever is configured to receive the guest identity and the unique card identifier. The card key management server is configured to communicate with the interaction server to receive the guest identity and the unique card identifier to register a room of the facility with a unique guest.

Yet another aspect of the present invention is a method for self-service access to a card key locked room of a facility. The method includes retrieving a card key for a room. The card key has a unique card identifier and a graphical identifier printed on a surface of the card key. The method also includes activating a mobile application resident on a mobile communication device of a guest. The mobile application is authenticated to the guest to produce a unique guest identity for the guest. The method also includes scanning the graphical identifier with mobile communication device using the mobile application to decode and produce the unique card identifier for the card key. The method also includes transmitting the guest identity and the unique card identifier over a network to a remote server. The server is in communication with a card key management system. The method also includes receiving the guest identity and the unique card identifier at the server, interfacing with the card key management system and registering the card identifier with a room selected for the guest associated with the guest identity. The method also includes accessing the room using the card key.

The graphical identifier is preferably a QRC. Alternatively, the graphical identifier is a barcode. The card key is preferably a magnetic card key. Alternatively, the card key is a proximity card key. A proximity card key typically uses passive RFID.

Yet another aspect of the present invention is a system for self-service access to a card key locked room of a facility. The system includes a facility having a plurality of rooms, a plurality of card keys, a plurality of mobile communication devices, an interaction server, and a card key management server. The card keys are located at the facility. Each of the plurality of card keys has a unique card identifier and a graphical identifier printed on a surface of each of the plurality of card keys. Each of the plurality of mobile communication devices has a mobile application resident on the mobile communication device. Each of the mobile applications is authenticated to a particular guest to produce a unique guest identity for each guest. Each of the mobile applications is configured to scan the graphical identifier of a card key with the mobile communication device to decode and produce the unique card identifier for the card key and transmit the guest identity and the unique card identifier over a network. The interaction server is in communication with each of the mobile communication devices over the network. The interaction server is configured to receive the guest identity and the unique card identifier. The card key management server is configured to communicate with the interaction server to receive the guest identity and the unique card identifier to register a room of the facility with a unique guest.

Having briefly described the present invention, the above and further objects, features and advantages thereof will be recognized by those skilled in the pertinent art from the following detailed description of the invention when taken in conjunction with the accompanying drawings.

DETAILED DESCRIPTION OF THE INVENTION

Figure 1:
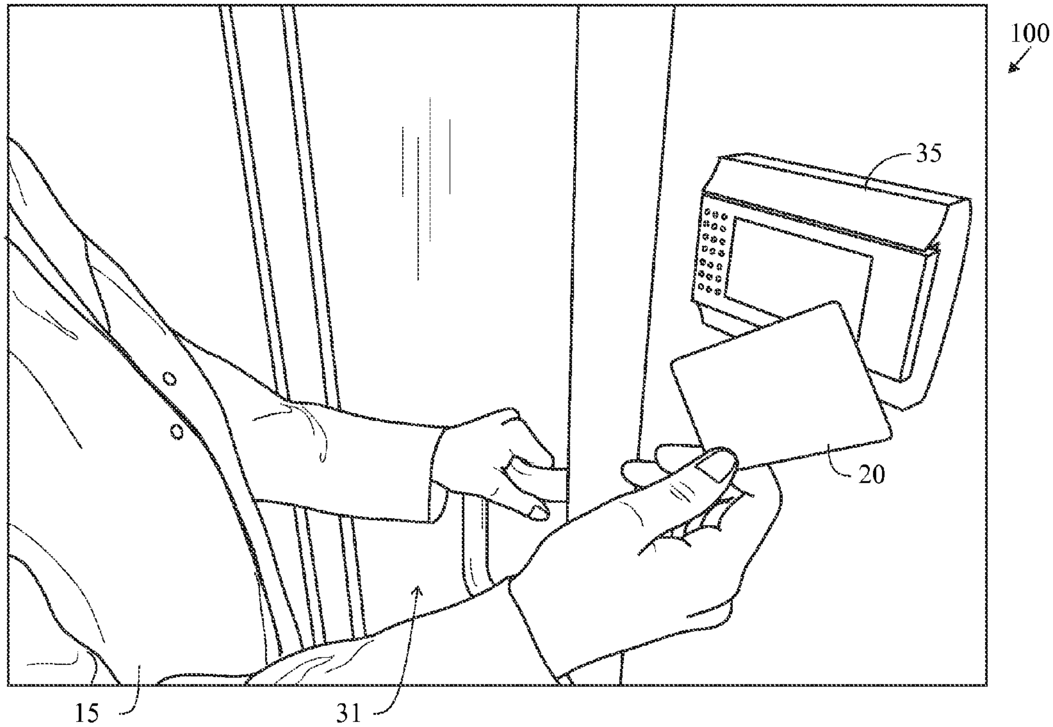
FIG. 1 is an illustration of a hotel guest using a magnetic card key with a QRC.

As shown in image 100 of FIG. 1, a card key 20 is used to access a room 31 of a facility by a guest 15. The guest 15 has used a mobile application on his mobile communication device 25 to activate the card key 20 for use in accessing the room 31 through a card reader 35. The guest 15 is able to activate the card key without the assistance of personnel of the facility. The card key 20 is preferably a magnetic card key. Alternatively, the card key 20 is a proximity card key. A proximity card key typically uses passive RFID.

Figure 2:
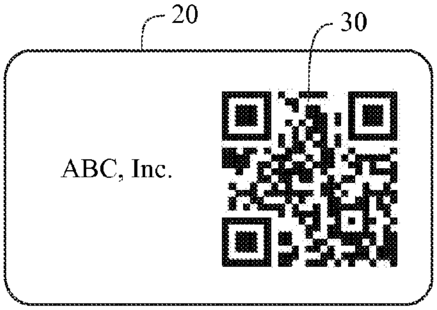
FIG. 2 is a plan view of back of a magnetic card key illustrating a magnetic strip of the key card.
Figure 3:
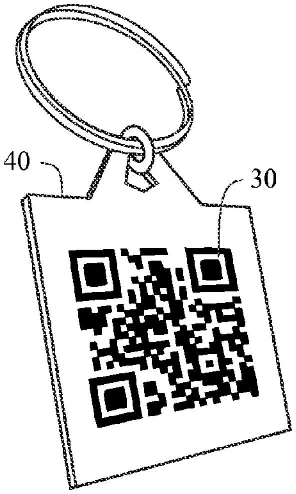
FIG. 3 is a perspective view of a magnetic card key with a QRC.

As shown in FIGS. 2 and 3, the card key 20 preferably has a magnetic strip which has a unique card identifier and the card key 20 preferably has a graphical identifier 30 printed on a surface 40 of the card key 20 that is used to communicate with the mobile application resident on the end-user's mobile communication device 25. Preferably the graphical identifier 30 is a QRC. Alternatively, the graphical identifier is a barcode. The QRC is scanned with mobile communication device 25 preferably using the mobile application to decode and produce the unique card identifier for the card key 20. The end-user identity and the unique card identifier are transmitted over a network to an interaction server. The interaction server is in communication with a card key management system which receives the end-user identity and the unique card identifier and registers the card identifier with a room selected for the end-user associated with the end-user identity.

The end-user identity is produced through one of loyalty program information, a reservation code or other account information. The network is preferably a cellular network or a WiFi network. The facility is preferably a hotel, and the room is a hotel room. Alternatively, the facility is a club, and the room is a recreational room of the club.

The mobile communication devices 25 utilized with the present invention preferably include mobile phones, smartphones, tablet computers, PDAs and the like. Examples of smartphones include the IPHONE® smartphone from Apple, Inc., BLACKBERRY® smartphones from Research In Motion, the DROID® smartphone from Motorola Mobility Inc., and many more. Examples of tablet computing devices include the IPAD® tablet from Apple Inc., and the XOOM™ tablet from Motorola Mobility Inc.

Each of the interface descriptions preferably discloses use of at least one communication protocol to establish handshaking or bi-directional communications. These protocols preferably include but are not limited to XML, HTTP, TCP/IP, Serial, UDP, FTP, Web Services, WAP, SMTP, SMPP, DTS, Stored Procedures, Import/Export, Global Positioning Triangulation, IM, SMS, MMS, GPRS and Flash. The databases used with the system preferably include but are not limited to MSSQL, Access, MySQL, Progress, Oracle, DB2, Open Source DBs and others. Operating system used with the system preferably include Microsoft 2010, XP, Vista, 200o Server, 2003 Server, 2008 Server, Windows Mobile, Linux, Android, Unix, I series, AS 400 and Apple OS.

The underlying protocol at a server, is preferably Internet Protocol Suite (Transfer Control Protocol/Internet Protocol ("TCP/IP")), and the transmission protocol to receive a file is preferably a file transfer protocol ("FTP"), Hypertext Transfer Protocol ("HTTP"), Secure Hypertext Transfer Protocol ("HTTPS") or other similar protocols. The transmission protocol ranges from SIP to MGCP to FTP and beyond. The protocol at the server is preferably HTTPS.

A mobile communication service provider (aka phone carrier) of the customer such as VERIZON, AT&T, SPRINT, T-MOBILE, and the like mobile communication service providers, provide the communication network for communication to the data capable communication device of the customer.

Figure 4:
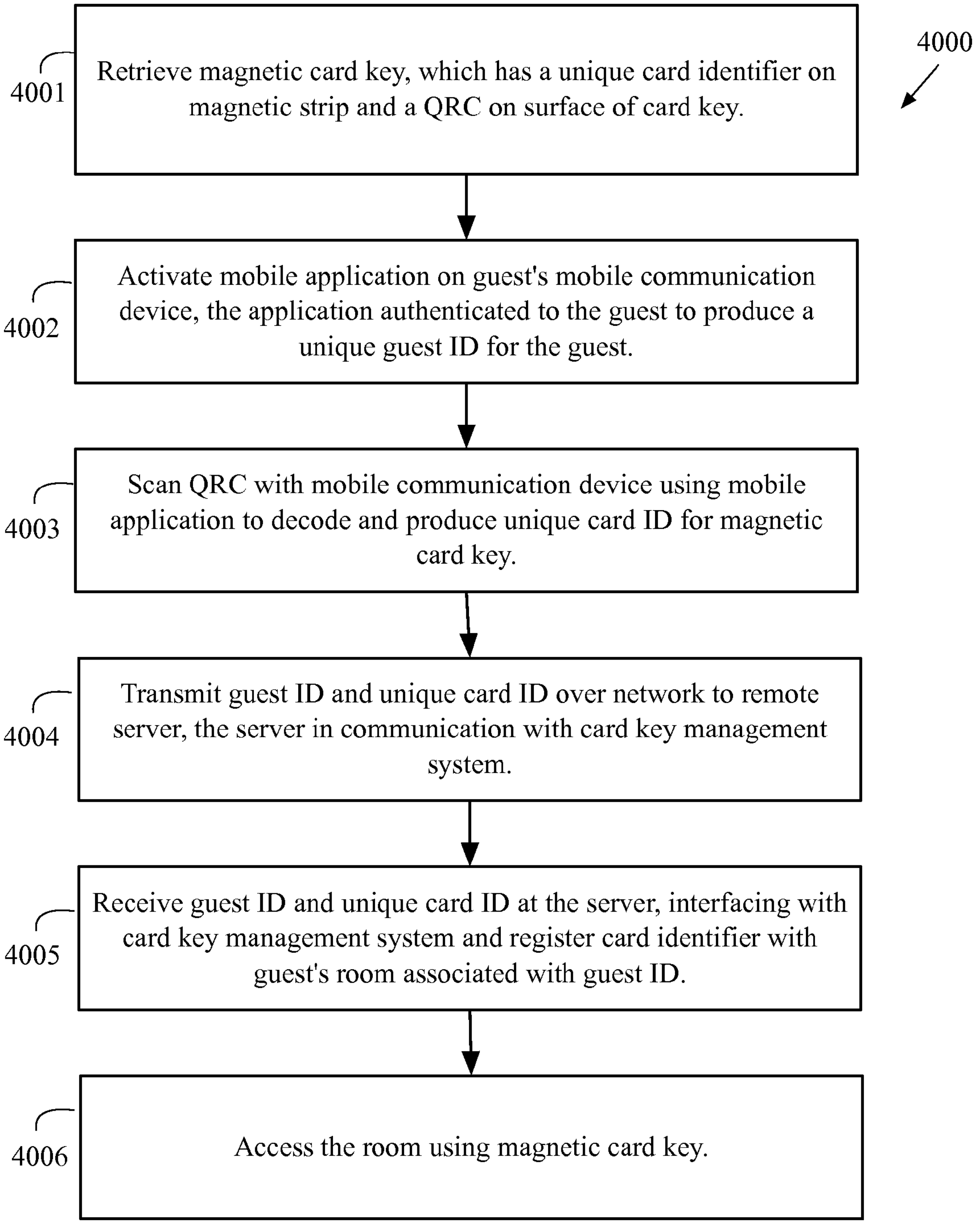
FIG. 4 is a flow chart of a method for utilizing a magnetic card key with a QRC.

A flow chart for a method 4000 for self-service access to a card key locked room of a facility is shown in FIG. 4. At block 4001, a user retrieves a card key, which has a QRC image on the front side and a magnetic strip on the back side containing a unique card identifier. The user's mobile communication device has a mobile application that is then activated at block 4002 so that the application authenticates the user to produce a guest identifier (ID) for the user. At block 4003, the QRC is scanned using the mobile communication device to decode and generate a unique card identifier for the magnetic card key. Then the guest ID and the card key ID is transmitted at block 4004 over a network to a remote server that is in communication with a card key management system. The server, interfacing with the card key management system, receives both guest ID and card key ID and registers the card key ID with a guest room selected for the user's guest ID at block 4005. The user can then access the room using the card key at block 4006.

Figure 5:
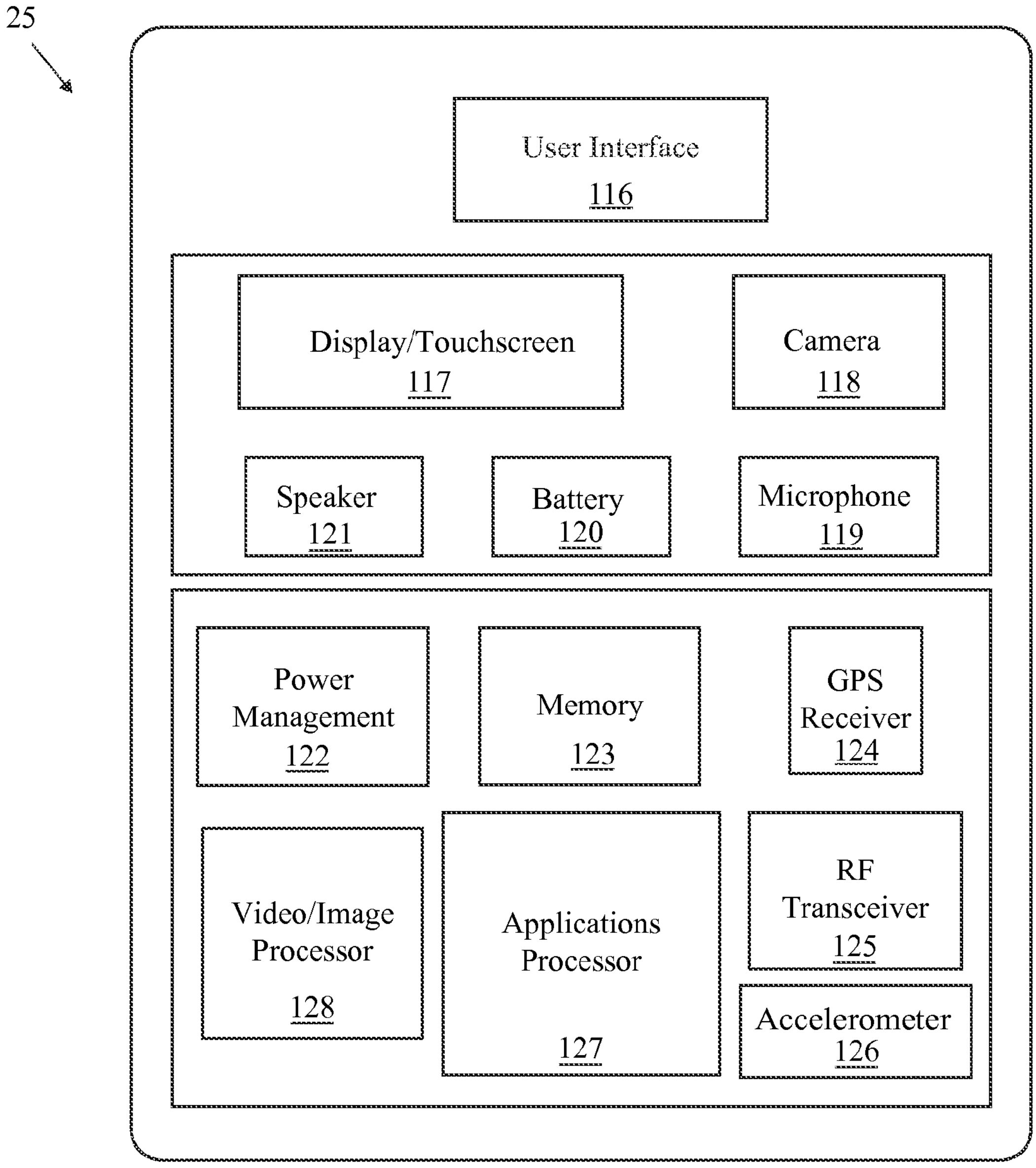
FIG. 5 is a block diagram of a mobile communication device.

FIG. 5 is a block diagram of a preferred mobile communication device 25 utilized with the present invention. The mobile communication device 25 preferably comprises a user interface 116, a touchscreen 117, a camera 118, a microphone 119, a battery 120, a speaker 121, a power management component 122, a memory 123, a GPS receiver 124, a RF transceiver 125, an accelerometer 126, an applications processor 127 and a video/image processor 128. Those skilled in the pertinent art will recognize that other components may be present in a mobile communication device without departing from the scope and spirit on the present invention. A resident mobile application is preferably stored in a memory 123 of the mobile communication device 25 and interfaces with the accelerometer 126 of the mobile communication device 25.

Figure 6:
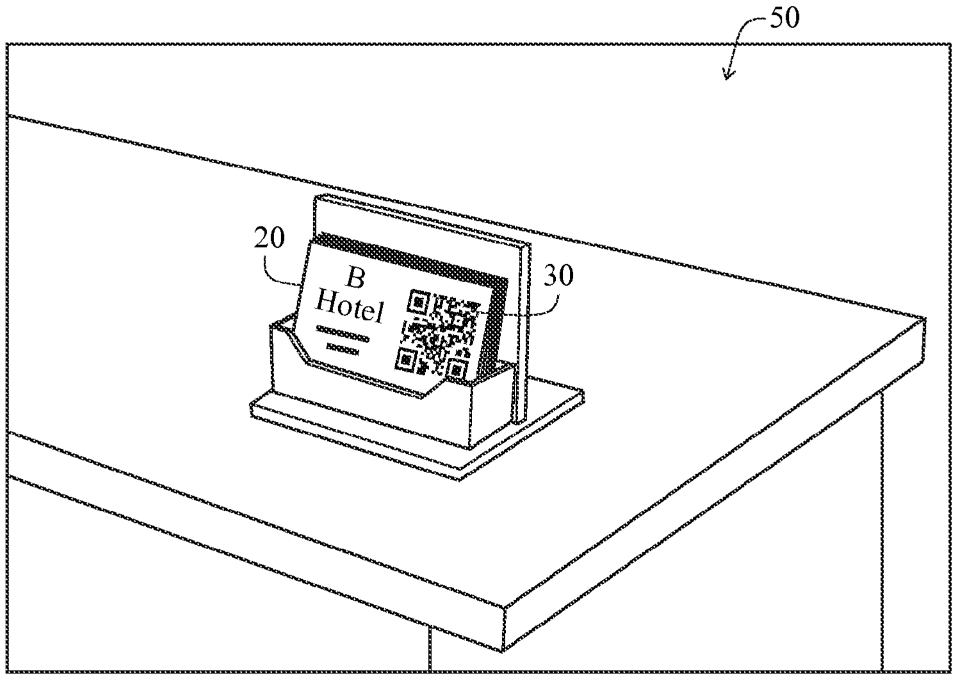
FIG. 6 is an illustration of a hotel desk with a stack of magnetic card keys with QRCs.

As shown in illustration 50 of FIG. 6, the card keys 20 are provided by the facility as a stack of card keys 20 on a front desk. A guest retrieves a card key 20 and scans the graphical identifier 30 with a camera of a mobile communication device 25 having a mobile application with a guest identity. The guest identity and the unique card identifier for the magnetic card key are transmitted over a network to an interaction server resulting in the activation of the magnetic card key for access to a room reserved by the guest.

Figure 7:
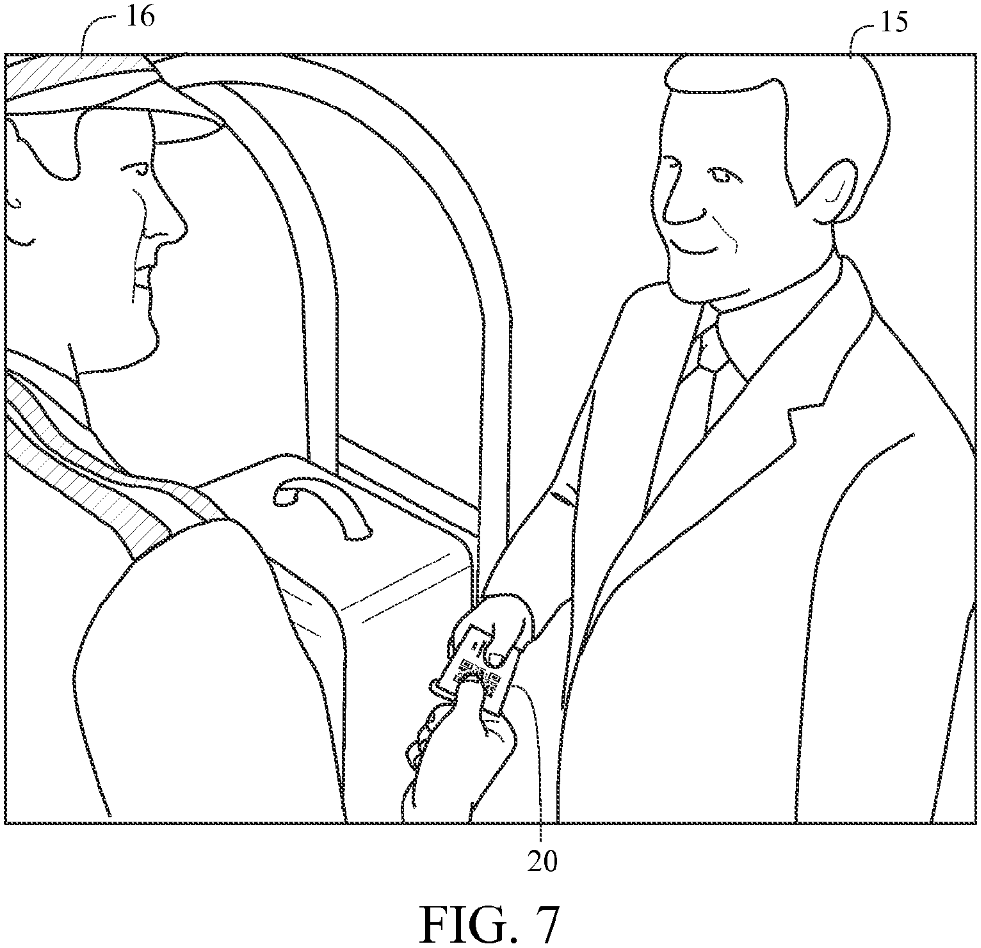
FIG. 7 is an illustration of a hotel guest getting a magnetic card key with a QRC from a valet.

Alternatively, as shown in FIG. 7, a valet 16 gives a guest 15 a card key 20 with a graphical identifier 30 as the valet 15 takes the guest's luggage. The guest scans the graphical identifier 30 with a camera of a mobile communication device 25 having a mobile application with a guest identity. The guest identity and the unique card identifier for the card key 20 are transmitted over a network to an interaction server resulting in the activation of the card key for access to a room reserved by the guest 15. In this manner the guest 15 does not need to wait in line to check-in to the facility.

Figure 8:
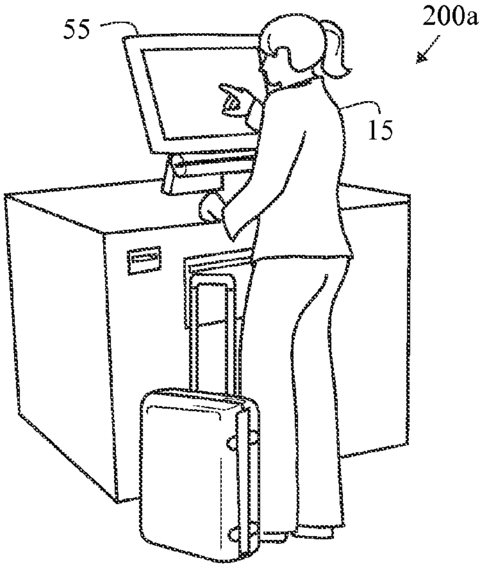
FIG. 8 (PRIOR ART)
FIG. 8 is an illustration of a guest at a prior art kiosk for checking into or out of a hotel.
Figure 8A:
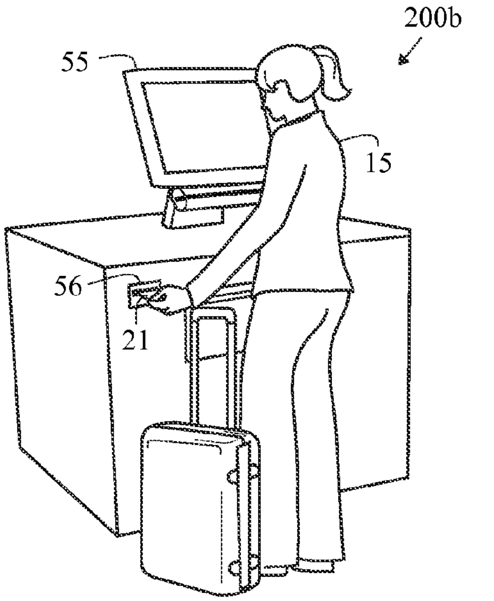
FIG. 8A (PRIOR ART)
FIG. 8A is an illustration of a guest at a prior art kiosk for checking into or out of a hotel.
Figure 8B:
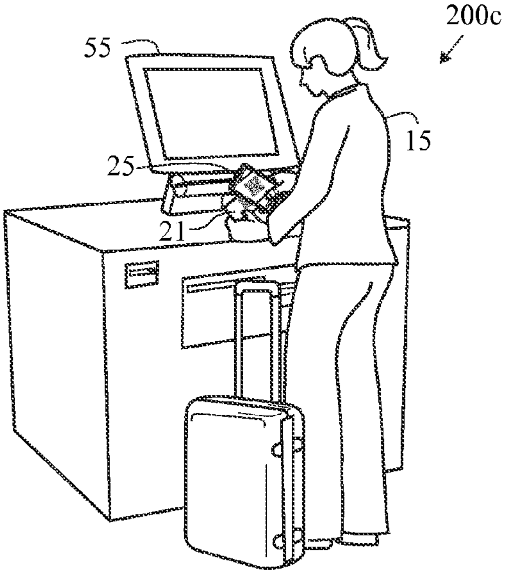
FIG. 8B (PRIOR ART)
FIG. 8B is an illustration of a guest at a prior art kiosk for checking into or out of a hotel.

FIGS. 8, 8A and 8B illustrate steps 200*a*, 200*b* and 200*c* of a prior art process of using a kiosk to check-in or check-out of a hotel. The guest 15 has to access a computer on the kiosk 55 to activate a card 21 that is dispensed from a card dispenser 56 of the kiosk 55.

Figure 9:
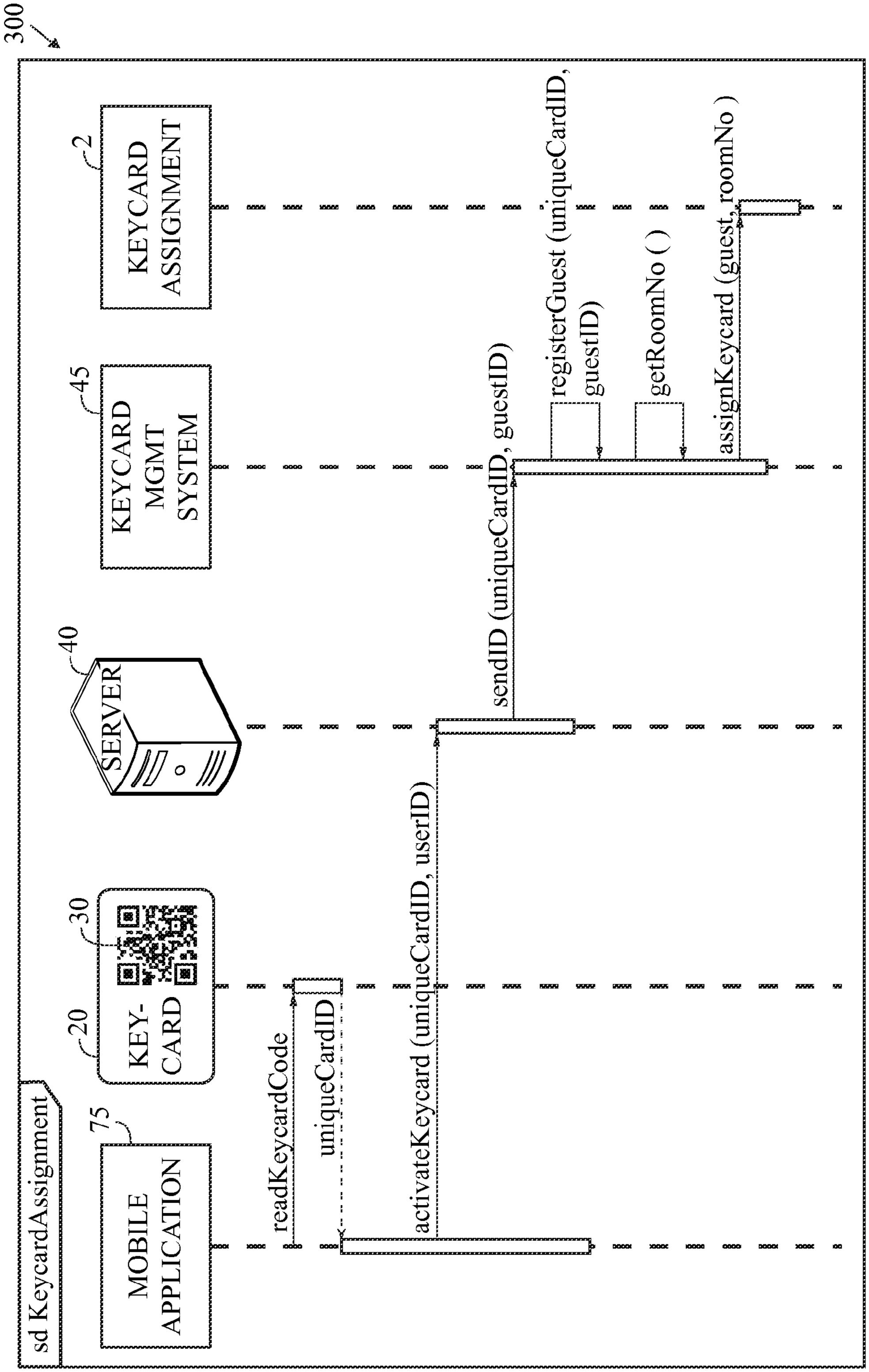
FIG. 9 a sequence diagram sequence diagram for utilizing a card key with a graphical identifier for self-service access to card key locked room of a facility.

A sequence diagram 300 for utilizing a card key with a graphical identifier for self-service access to card key locked room of a facility is shown in FIG. 9. A guest retrieves a card key 20, which has a graphical identifier 30 on a front side and preferably a magnetic strip on a back side containing a unique card identifier. The guest's mobile communication device 25 has a mobile application 75 that is then activated so that the application 75 authenticates the user to produce a guest identifier (user ID) for the guest. The graphical identifier 30 is scanned using the mobile communication device 25 to decode and generate a unique card identifier for the card key 30. Then, the user ID and the card key ID are transmitted over a network to a remote server 40 that is in communication with a card key management system 45. The remote server 40, interfacing with the card key management system 45, receives both the user ID and card key ID and at a keycard assignment stage 2 registers the card key ID with a guest room selected for the guest's user ID. The guest can then access the room using the card key 20.

From the foregoing it is believed that those skilled in the pertinent art will recognize the meritorious advancement of this invention and will readily understand that while the present invention has been described in association with a preferred embodiment thereof, and other embodiments illustrated in the accompanying drawings, numerous changes modification and substitutions of equivalents may be made therein without departing from the spirit and scope of this invention which is intended to be unlimited by the foregoing except as may appear in the following appended claim. Therefore, the embodiments of the invention in which an exclusive property or privilege is claimed are defined in the following appended claims.

I claim as my invention:

1. A method for self-service access to a card key locked room of a facility, the method comprising:

activating a mobile application resident on a mobile communication device of a guest, the mobile application authenticated to the guest to produce a unique guest identity for the guest, the mobile application for a loyalty program of a facility;

scanning a graphical identifier of a card key for a room of the facility with the mobile communication device using the mobile application to retrieve a unique card identifier for the card key;

transmitting the unique guest identity and the unique card identifier from the mobile application over a network to a remote server, the server in communication with a card key management system;

receiving the guest identity and the unique card identifier at the server, interfacing with the card key management system and registering the card identifier with a room selected for the guest associated with the guest identity; and accessing the room using the card key.

2. The method according to claim 1 wherein the guest identity is produced through one of loyalty program information, a reservation code or other account information.

3. The method according to claim 1 wherein the network is a cellular or WiFi network.

4. The method according to claim 1 wherein the mobile communication device is a mobile phone or a tablet computer.

5. The method according to claim 1 wherein the graphical identifier is a QRC.

6. The method according to claim 1 wherein the facility is a hotel, and the room is a hotel room, or the facility is a club, and the room is a recreational room of the club.

7. The method according to claim 1 wherein the graphical identifier is a barcode.

8. The method according to claim 1 wherein each of the plurality of card keys is a magnetic card key having a magnetic strip with the unique card identifier.

9. The method according to claim 1 wherein each of the plurality of card keys is a proximity card key.

10. A system for self-service access to a card key locked room of a facility, the system comprising:

a facility having a plurality of rooms;

a plurality of card keys located at the facility, each of the plurality of card keys having a unique card identifier and a graphical identifier printed on a surface of each of the plurality of card keys;

an interaction server in communication with each of a plurality of mobile communication devices over a network, each of the plurality of mobile communication devices having a mobile application resident on the mobile communication device, each of the mobile applications authenticated to a particular guest to produce a unique guest identity for each guest, each of the mobile applications associated with a loyalty program for the facility, the interaction server configured to receive over the network the unique guest identity and the unique card identifier from a mobile application of a mobile device of the plurality of mobile devices which has scanned a card key of the plurality of card keys for access to a room; and a card key management server configured to communicate with the interaction server to receive the guest identity and the unique card identifier to register a room of the facility with a unique guest.

11. The system according to claim 10 wherein the guest identity is produced through one of loyalty program information, a reservation code or other account information.

12. The system according to claim 10 wherein the network is a cellular or WiFi network.

13. The system according to claim 10 wherein each of the plurality of mobile communication devices is a mobile phone or a tablet computer.

14. The system according to claim 10 wherein the graphical identifier is a QRC.

15. The system according to claim 10 wherein the facility is a hotel, and the room is a hotel room, or the facility is a club, and the room is a recreational room of the club.

16. The system according to claim 10 wherein the graphical identifier is a barcode.

17. The system according to claim 10 wherein each of the plurality of card keys is a magnetic card key having a magnetic strip with the unique card identifier.

18. The system according to claim 10 wherein each of the plurality of card keys is a proximity card key.

* * * * *